(12) United States Patent
Scholz et al.

(10) Patent No.: US 8,100,051 B2
(45) Date of Patent: Jan. 24, 2012

(54) CENTRE ARM FOR HOLDING AN UPPER CONTACT GRILLING OR ROASTING PLATE AS WELL AS CONTACT GRILLING OR ROASTING DEVICES WITH SUCH A CENTRE ARM

(75) Inventors: Kay Scholz, Hamburg (DE); Otto Langguth, Tangstedt (DE); Karsten Anklam, Bargteheide (DE)

(73) Assignee: H.H. Scholz KG, Hamburg (DE)

( * ) Notice: Subject to any disclaimer, the term of this patent is extended or adjusted under 35 U.S.C. 154(b) by 544 days.

(21) Appl. No.: 12/365,610

(22) Filed: Feb. 4, 2009

(65) Prior Publication Data
US 2010/0107894 A1    May 6, 2010

(30) Foreign Application Priority Data

Nov. 5, 2008  (DE) .......................... 10 2008 056 475

(51) Int. Cl.
*A47J 37/06* (2006.01)
(52) U.S. Cl. ............. 99/351; 99/374; 99/377; 99/379
(58) Field of Classification Search ............ 99/349, 99/351, 372, 374, 376, 377, 379, 380, 389, 99/390, 391, 393, 422, 423, 424, 426, 427, 99/439
See application file for complete search history.

(56) References Cited

U.S. PATENT DOCUMENTS

| | | | | |
|---|---|---|---|---|
| 1,697,384 A | * | 1/1929 | Coutu | 99/349 |
| 1,977,237 A | * | 10/1934 | Methe | 99/379 |
| 2,033,060 A | * | 3/1936 | Anderson | 99/379 |
| 2,039,218 A | * | 4/1936 | Govoroff | 99/379 |

(Continued)

FOREIGN PATENT DOCUMENTS

CH          610 747 A5      5/1979

(Continued)

OTHER PUBLICATIONS

Examination Report, dated Apr. 30, 2009, issued in corresponding German Application No. 10 2008 056 473.7-16, 4 pages.

(Continued)

*Primary Examiner* — Stephen F Gerrity
(74) *Attorney, Agent, or Firm* — Venable LLP; Robert Kinberg; Leigh D. Thelen

(57) ABSTRACT

The invention concerns a centre arm for holding an upper contact grilling or roasting plate, the centre arm having a substantially vertical supporting section and a holding section which is arranged pivotably on the vertical supporting section and to which is attached the contact grilling or roasting plate, and in the holding section being arranged a device for weight relief for the upper contact grilling or roasting plate to be fitted on the holding section, the device for weight relief including at least one guide means which is constructed and designed at one end for pivotable mounting and on which is movably arranged a sliding element, a return element arranged on the free end of the guide means and secured by a stop means between the sliding element and the stop means, and also an adjusting device which can be actuated by means of an actuating element for varying the distance between the sliding element and the stop means in the longitudinal direction of the guide means, which is distinguished in that the adjusting device includes a control profile element which has a control profile for bringing about an axial movement of the sliding element in the longitudinal direction of the guide means. Furthermore the invention concerns a contact grilling or roasting device having such a centre arm.

17 Claims, 7 Drawing Sheets

U.S. PATENT DOCUMENTS

| | | | | | |
|---|---|---|---|---|---|
| 2,547,982 | A | * | 4/1951 | Sivley | 99/423 |
| 2,607,287 | A | * | 8/1952 | Price | 99/372 |
| 2,718,842 | A | * | 9/1955 | Klemm | 99/351 |
| 3,620,156 | A | * | 11/1971 | Schindler et al. | 99/349 |
| 4,729,296 | A | * | 3/1988 | Sabin | 99/349 |
| 4,989,580 | A | | 2/1991 | Dunham | |
| 5,341,727 | A | * | 8/1994 | Dickson | 99/349 |
| 5,423,253 | A | * | 6/1995 | Olson et al. | 99/351 |
| 5,531,155 | A | * | 7/1996 | Pellicane et al. | 99/349 |
| 5,619,907 | A | * | 4/1997 | Orgelmacher | 99/351 |
| 5,758,568 | A | * | 6/1998 | Moravec | 99/349 |
| 7,448,373 | B2 | * | 11/2008 | Hill et al. | 99/379 |
| 2001/0042448 | A1 | * | 11/2001 | Menektchiev et al. | 99/372 |
| 2010/0107895 | A1 | | 5/2010 | Scholz et al. | |
| 2010/0107896 | A1 | | 5/2010 | Scholz et al. | |
| 2010/0107897 | A1 | | 5/2010 | Scholz et al. | |

FOREIGN PATENT DOCUMENTS

| | | |
|---|---|---|
| DE | 839 393 C | 5/1952 |
| DE | 28 05 997 A1 | 8/1979 |
| EP | 0 662 299 A1 | 7/1995 |
| FR | 2 516 352 A1 | 5/1983 |
| WO | WO-2008/093330 A2 | 8/2008 |

OTHER PUBLICATIONS

Examination Report, dated Mar. 23, 2009, issued in corresponding German Application No. 10 2008 056 474.5-16, 4 pages.

Examination Report, dated Mar. 9, 2009, issued in corresponding German Application No. 10 2008 056 476.1-16, 4 pages.

International Search Report dated Apr. 22, 2010, issued in corresponding PCT Application No. PCT/EP2009/008052, 11 pages.

International Search Report dated Apr. 22, 2010, issued in corresponding PCT Application No. PCT/EP2009/008053, 11 pages.

International Search Report dated Apr. 22, 2010, issued in corresponding PCT Application No. PCT/EP2009/008054, 11 pages.

International Search Report dated Apr. 22, 2010, issued in corresponding for PCT Application No. PCT/EP2009/008055, 11 pages.

\* cited by examiner

CENTRE ARM FOR HOLDING AN UPPER CONTACT GRILLING OR ROASTING PLATE AS WELL AS CONTACT GRILLING OR ROASTING DEVICES WITH SUCH A CENTRE ARM

CROSS-REFERENCE TO RELATED APPLICATIONS

This application claims the priority of German patent application DE 10 2008 056 475.3, filed on Nov. 5, 2008, the subject matter of which is incorporated herein by reference.

BACKGROUND OF THE INVENTION

The invention concerns a centre arm for holding an upper contact grilling or roasting plate, wherein the centre arm has a substantially vertical supporting section and a holding section which is arranged pivotably on the vertical supporting section and to which the upper contact grilling or roasting plate can be attached, and in the holding section is arranged a device for weight relief for the upper contact grilling or roasting plate to be fitted on the holding section, the device for weight relief including at least one guide means which is constructed and designed at one end for pivotable mounting and on which is movably arranged a sliding element, a return element arranged on the free end of the guide means and secured by a stop means between the sliding element and the stop means, and also an adjusting device which can be actuated by means of an actuating element for varying the distance between the sliding element and the stop means in the longitudinal direction of the guide means. Furthermore the invention concerns a contact grilling or roasting device having at least one upper contact grilling or roasting plate and a lower contact grilling or roasting plate, the or each upper contact grilling or roasting plate being arranged pivotably by a centre arm on the lower contact grilling or roasting plate.

Centre arms of this kind are used in the field of contact grilling or roasting devices having at least two contact plates designed for contact with the material to be grilled or roasted. Such contact grilling or roasting devices are known universally in practice and include an upper contact grilling or roasting plate and a lower contact grilling or roasting plate, the upper contact grilling or roasting plate being pivotably linked by a centre arm to the lower contact grilling or roasting plate. Associated with both contact plates is a unit which receives the wiring and has corresponding control elements, the unit usually being arranged below the two contact plates. The centre arm is usually in two parts. To put it another way, one centre arm element is mounted rigidly in the region of the lower contact grilling or roasting plate. A second centre arm element is arranged pivotably on the first centre arm element and holds the upper contact grilling or roasting plate. In the region of the centre arm is usually provided at least one device for weight relief for the upper contact grilling or roasting plate. Such a device for weight relief, namely one for finely adjusting the weight relief, is arranged in the pivotable centre arm element carrying the upper contact grilling or roasting plate.

Usually, at least the device for weight relief is adjustable for fine adjustment in the pivotable centre arm element. For this purpose the device for weight relief has an actuating element. A centre arm with such a device for adjustable weight relief is known e.g. from EP 0 662 299 B1. The adjustable weight relief device described therein is arranged in the pivotable centre arm portion. The device includes a rod which is mounted on the stationary centre arm element outside the pivot axis of the pivotable centre arm element. On the rod is arranged a sliding element which is connected to an adjusting knob as an actuating element for adjusting the sliding element via a compression spring by means of a screw connection and a bearing bush. Round the bore for the adjusting knob, that is, the upwardly directed opening in the centre arm element for passage of the adjusting knob or bearing bush from the outside into the interior of the centre arm element, is formed a hole circle in the individual holes of which a pin located on the adjusting knob can latch. By pulling on the adjusting knob, the pin is pulled out of the respective hole of the hole circle, and by a rotating movement of the adjusting knob it is latched in another hole. By rotation of the adjusting knob, the sliding element is slid via the adjusting device on the rod, as the sliding element is connected to the adjusting knob outside the centre axis of the adjusting knob. On the end of the rod opposite the mounting of the rod a spring element is arranged and held on the rod by a stop. In the open position of the upper contact grilling or roasting plate, the distance between the sliding element and the stop is greatest due to the different pivot axes or pivot axes offset from each other, respectively, on the rod. When the upper contact grilling or roasting plate is lowered in the direction of the lower contact grilling or roasting plate, the distance between the sliding element and the stop decreases until the sliding element abuts against the spring element, so that a compressive force is built up, which counteracts further lowering of the centre arm element and hence of the upper contact grilling or roasting plate. Depending on the position of the adjusting knob and hence the position of the sliding element on the rod, the compressive force can be varied.

The construction of the adjusting device known from the state of the art, which is oriented transversely to the longitudinal axis of the guide means, firstly however has the drawback that it is elaborate in construction. Secondly, for the actuating element or bearing bush as part of the adjusting device an aperture is necessary, namely an opening with a hole circle, on the upper side of the centre arm element, which on the one hand increases the risk of soiling inside the centre arm element and on the other hand makes the process of cleaning the centre arm element from the outside difficult. To put it another way, the known device for weight relief is inadequate from hygienic aspects. Also, handling of the actuating element for adjustment of weight relief is laborious and imprecise and allows only a short adjusting path.

SUMMARY OF THE INVENTION

It is therefore the object of the present invention to provide a centre arm with a device for weight relief, which is improved from hygienic aspects and which ensures precise and easy adjustment of weight relief. Furthermore it is the object of the invention to propose a corresponding contact grilling device.

This object is achieved by a centre arm of the kind mentioned herein-before by the fact that the adjusting device includes a control profile element which has a control profile for bringing about an axial movement of the sliding element in the longitudinal direction of the guide means. With this design according to the invention, on the one hand displacement of the actuating element from the upper side to the end face of the centre arm results in creating a closed upper side of the centre arm, so that penetration of fat, vapours or the like is prevented and easy cleaning is ensured. On the other hand, the control profile element which is referred to as an adjusting crown or crown guide allows reliable and easy adjustment.

An appropriate development is distinguished by the fact that the control profile element is a stepped element having at least two latch steps, the latch steps being axially offset from each other in the longitudinal direction of the guide means. To put it another way, the stepped element has at least two adjusting positions which, starting from the actuating element, are radially offset and located one behind the other. With the design according to the invention, firstly a reduction of the adjusting positions actually needed and secondly neat separation of the essential adjusting positions can be achieved. As a result the reliability and the handling are simplified.

Advantageously, the guide means includes two guide rods, so that the sliding element is guided on two guide rods. Hence the functionality and reliability of the device for weight relief is improved in particular with respect to handling.

A particularly preferred embodiment is characterised in that the centre arm according to any one of claims 1 to 13 is provided with an upper contact grilling or roasting plate. With this combination an independent grilling or roasting device is provided, which is simple to clean and easy to handle.

The object is also achieved by a contact grilling device having the features mentioned hereinbefore by the fact that the centre arm is designed according to any one of claims 1 to 15. The resulting advantages have already been mentioned above, so that reference is made to the corresponding passages to avoid repetition.

BRIEF DESCRIPTION OF THE DRAWINGS

Further appropriate and/or advantageous features and developments of the invention are apparent from the subsidiary claims and the description. A particularly preferred embodiment is described in more detail with the aid of the attached drawings. The drawings show:

BRIEF DESCRIPTION OF THE EMBODIMENTS

The centre arm shown in the figures serves as a conversion kit or, in combination with an upper contact grilling or roasting plate, as an independent grilling or roasting device, and can be used on its own or in combination with a lower contact grilling or roasting plate to form a contact grilling or roasting device.

Figure 1:
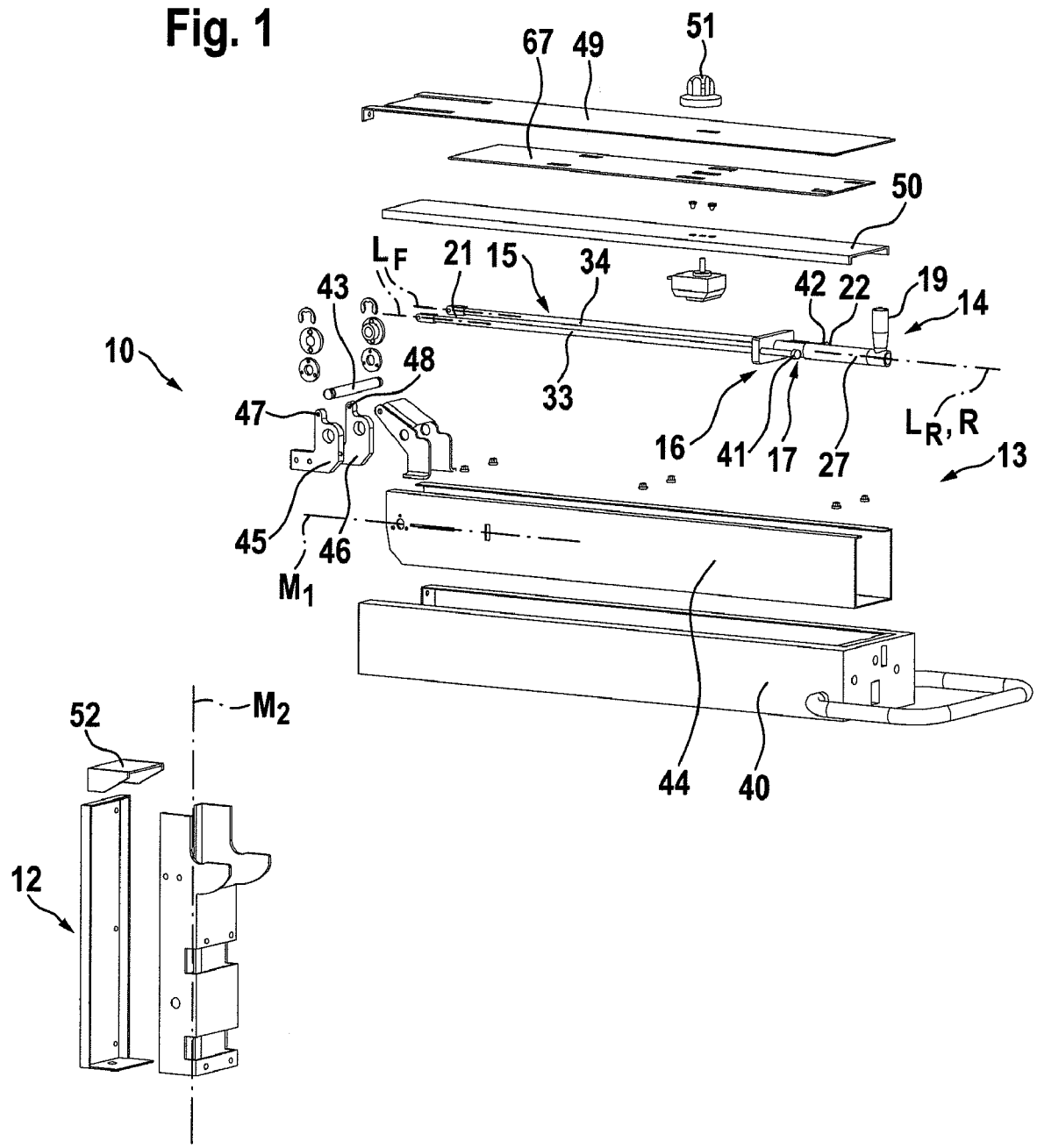
FIG. 1 an exploded view of a centre arm according to the invention.

FIG. 1 shows an exploded view of a centre arm 10 which is constructed and designed to receive an upper contact grilling or roasting plate 11. The centre arm 10 essentially consists of a vertical supporting section 12 and a holding section 13 arranged pivotably on the supporting section 12. The term "vertical supporting section 12" means that the supporting section 12 is oriented perpendicularly to a plane E usually spanned by a table, a base or the like, expressly also including an orientation which is slightly inclined from the perpendicular. The upper contact grilling or roasting plate 11 is attached to the holding section 13. Associated with the holding section 13 is a device 14 for weight relief for the upper contact grilling or roasting plate 11 to be fitted on the holding section 13, the device 14 for weight relief preferably being arranged completely within the holding section 13.

The device 14 for weight relief essentially includes a guide means 15, a sliding element 16, a stop means 17, a return element 18, an actuating element 19 and an adjusting device 20. The guide means 15 is constructed and designed at one end 21 for pivotable mounting (see below). The sliding element 16 is movable on the guide means 15, namely e.g. movable back and forth in sliding relationship. At the end 22 of the guide means 15 opposite the mounting, the stop means 17 is provided. Between the stop means 17 and the sliding element 16, on the guide means 15 is arranged the return element 18. For moving the sliding element 16 and hence for varying the distance between the sliding element 16 and the stop means 17, the adjusting device 20 which can be operated by the actuating element 19 is provided.

The adjusting device 20 includes a control profile element 23 which has a control profile for bringing about an axial movement of the sliding element 16 in the axial longitudinal direction of the guide means 15. The control profile preferably has a control curve 24 running in the axial direction of the guide means 15. Optionally, the control profile can also be a slope or otherwise shaped recess or the like. Particularly preferably, the control profile element 23 is a stepped element designed as an adjusting crown or crown guide and having at least two, but preferably three latch steps 25, the latch steps 25 being axially offset from each other in the longitudinal direction of the guide means 15. In addition the latch steps 25 are also radially offset from each other, so that the latch steps 25 are located as it were adjacent to each other and behind each other. The number of latch steps 25 can also vary and be in particular more than three.

The adjusting device 20 further includes a fixing device 26 which preferably consists of a latch rod 27 and at least one latch bolt 28. The latch bolt 28 corresponds to the latch steps 25 of the control profile element 23 or stepped element and can be brought into and out of engagement with the latter. The latch bolt 25 is arranged in the region of a free end 29 of the latch rod 27 and preferably extends perpendicularly to the peripheral surface of the preferably cylindrical latch rod 27.

The control profile element 23 or stepped element is preferably tubular and rigidly connected to the sliding element 16. To put it another way, the sliding element 16 and the stepped element form a unit movable on the guide means 15. The sliding element 16 has a central opening 30 for passage of the latch rod 27. The central opening 30 of the sliding element 16 is in line with the opening or passage of the tubular stepped element, so that the latch rod 27 can be pushed through the unit consisting of stepped element and sliding element 16. In addition to the central opening 30 the sliding element 16 has two further openings 31, 32. These openings 31, 32 serve for the passage of two guide rods 33, 34 which form the guide means 15. In other words, the sliding element 16 is movable on two guide rods 33, 34, namely e.g. arranged in sliding relationship.

As already mentioned, the latch rod 27 is guided through the unit composed of sliding element 16 and stepped element, in such a way that the longitudinal axis $L_R$ of the latch rod 27 extends approximately parallel to the longitudinal axis $L_F$ of the guide rods 33, 34. The free end 29 of the latch rod 27 which has the latch bolt 28 is in this case located on the side of the stepped element facing away from the sliding element 16. The latch rod 27 at the end 35 opposite the free end 29 is mounted rotatably on a housing 40 or in some other suitable position. The latch rod 27 is also stepped, forming a stop 36. To put it another way, the latch rod 27 is designed with different diameters in its longitudinal extent. This means that the latch rod 27 has a first section 37 of diameter $D_1$ and a second section 38 of diameter $D_2$, where $D_1 > D_2$. Due to the difference in diameter between the individual sections 37, 38, a shoulder which constitutes the stop 36 is formed.

On one of the sections, namely on the section 38 of smaller diameter $D_2$, is arranged a spring element 39. The spring element 39 is secured by the fact that it is arranged between the stop 36 and the sliding element 16. As already described, the latch rod 27 is constructed and designed on the one hand by mounting in the sliding element 16 and on the other hand for rotatable mounting in the region of the housing 40. At the end 35 of the latch rod 27 extending out of the housing 40 or the like (the end 35 can also be flush with the housing 40 or even end within the housing 40), as an actuating element 19 a control lever is arranged or fixed for performing a rotational movement of the latch rod 27 about an axis of rotation R. The axis of rotation R runs parallel to the longitudinal axis of the guide means 15 or the longitudinal axes $L_F$ of the guide rods 33, 34 and corresponds to the longitudinal axis $L_R$ of the latch rod 27.

In the described and preferred embodiment, the guide means 15 is composed of two guide rods 33, 34. The guide rods 33, 34 have, at each free end 22 which faces towards the actuating element 19, a stopper 41, 42 as the stop means 17. The stopper 41, 42 can be a thickening of the material, a screw head or any other suitable component. Between the sliding element 16 and the respective stopper 41, 42 a spring element is provided as the return element 18. However, other suitable components can be used as the return element 18 as well. Basically, all spring elements 39 and/or return elements 18 are exchangeable. Preferably compression springs are used as the spring elements 39 and return element 18. Spring elements 39 and return elements 18 with different spring weights can be used for holding or bearing upper contact grilling or roasting plates 11 of different weight.

In the embodiment shown in FIG. 1 the holding section 13 is pivotably connected by a shaft 43 to the supporting section 12. The shaft 43 is mounted on the holding section 13 in an inner housing 44 and/or the housing 40. The pivot shaft 43 of the holding section 13 is formed or arranged preferably approximately at the point of intersection of the centre axes $M_1$ of the holding section 13 on the one hand and $M_2$ of the supporting section 12 on the other hand. To put it another way, the pivot shaft 43 is arranged centrally in relation to the linkage point between supporting section 12 and holding section 13. But the arrangement or placement of the pivot shaft 43 is variable and can, unlike the position described above on the holding section 13, also be on the supporting section 12. The guide rods 33, 34 of the guide means 15 are mounted on bearing arms 45, 46 at their end 21 which is opposite the actuating element 19. The spaced-apart bearing arms 45, 46 are arranged on the pivot shaft 43 and have projections 47, 48 to which the guide rods 33, 34 are attached. Further, distance pieces 57, 58 can be associated with the bearing arms 45, 46, in each case directed outwards. The distance pieces 57, 58 are attached to the bearing arms 45, 46 releasably for exchange. The bearing arms 45, 46 with the distance pieces 57, 58 are guided within the inner housing 44.

By the inner housing 44, channels are formed within the housing 40 of the holding section 13. To put it another way, the inner chamber of the housing 40 is divided by the inner housing 44 into several chambers separate from each other.

The housing 40 is closed off from the outside by a cover 49. This cover 49 also closes the inner housing 44. The inner housing 44 can additionally have its own cover 50. Optionally, between the cover 49 for the housing 40 and the cover 50 for the inner housing 44 can be arranged a latch plate 67 or the like. Both the covers 49, 50 and the latch plate 67 serve in particular to increase the stability and torsion resistance of the centre arm 10.

Optionally, a knob 51 can also be provided for a thermostat. The knob 51 is preferably arranged on the upper side of the housing 40, but can be placed in other positions as well. To increase the sealing of the centre arm 10 particularly against fat residues, vapours or the like, all openings in the centre arm 10 are covered, as far as can be done mechanically, by flaps, screens or the like. By way of example, in the pivot region between the supporting section 12 and the holding section 13 is provided a flap 52.

Figure 2:
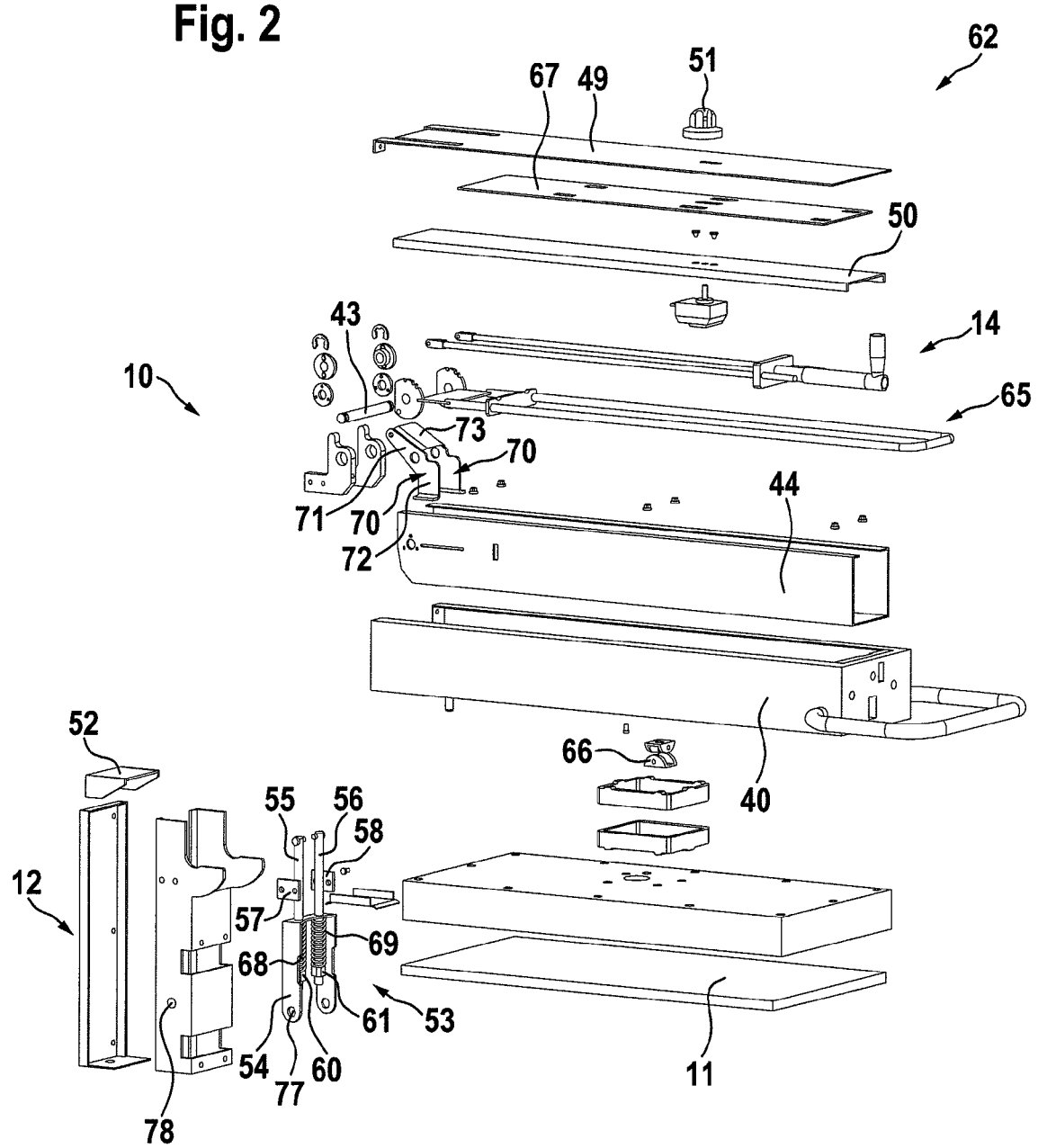
FIG. 2 an exploded view of a centre arm holding an upper contact grilling or roasting plate, FIG. 3 a side view of a centre arm with upper contact grilling or roasting plate, FIG. 4 an enlarged view of the device for weight relief, FIG. 5 a perspective view of the pivot range of the centre arm obliquely from the front, FIG. 6 a perspective view of the pivot range of the centre arm obliquely from the rear, FIG. 7 a contact grilling or roasting device with upper and lower contact grilling or roasting plates, and FIG. 8 a rear view of a contact grilling or roasting device with a lower contact grilling or roasting plate and two upper contact grilling or roasting plates opened out.
Figure 3:
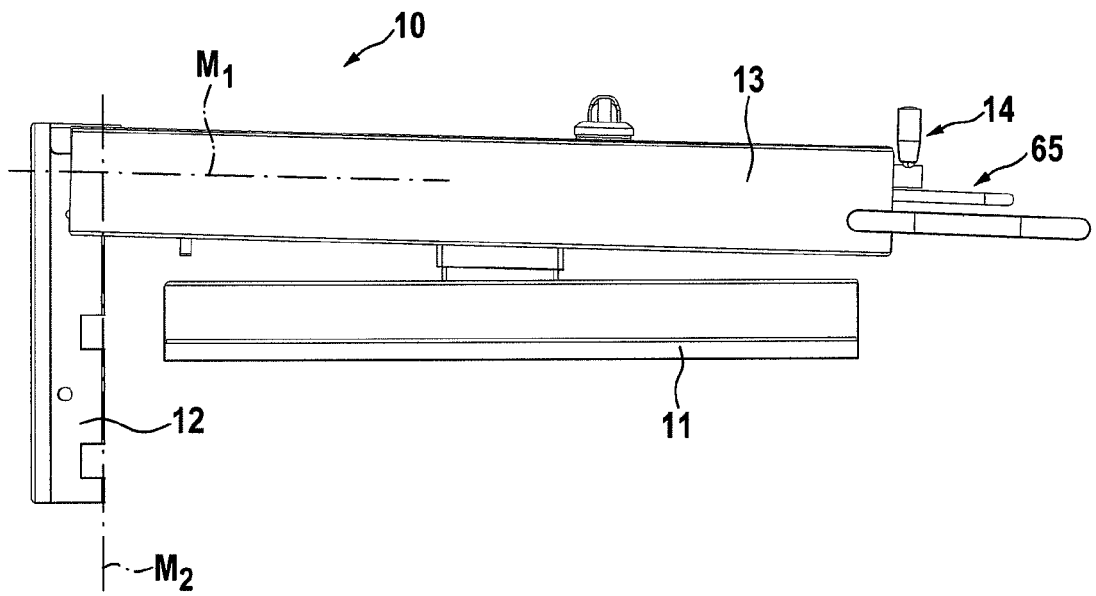
Figure 4:
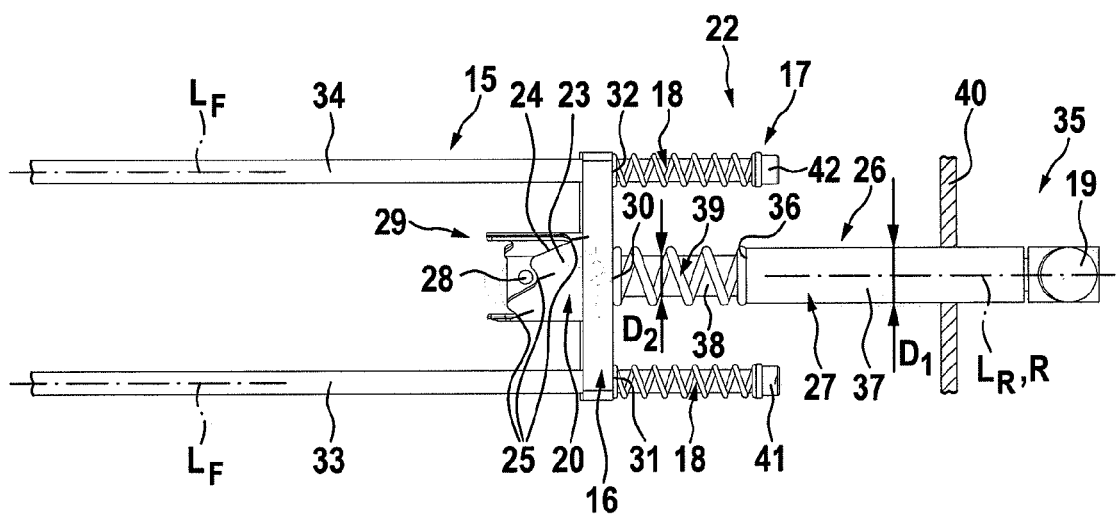
Figure 5:
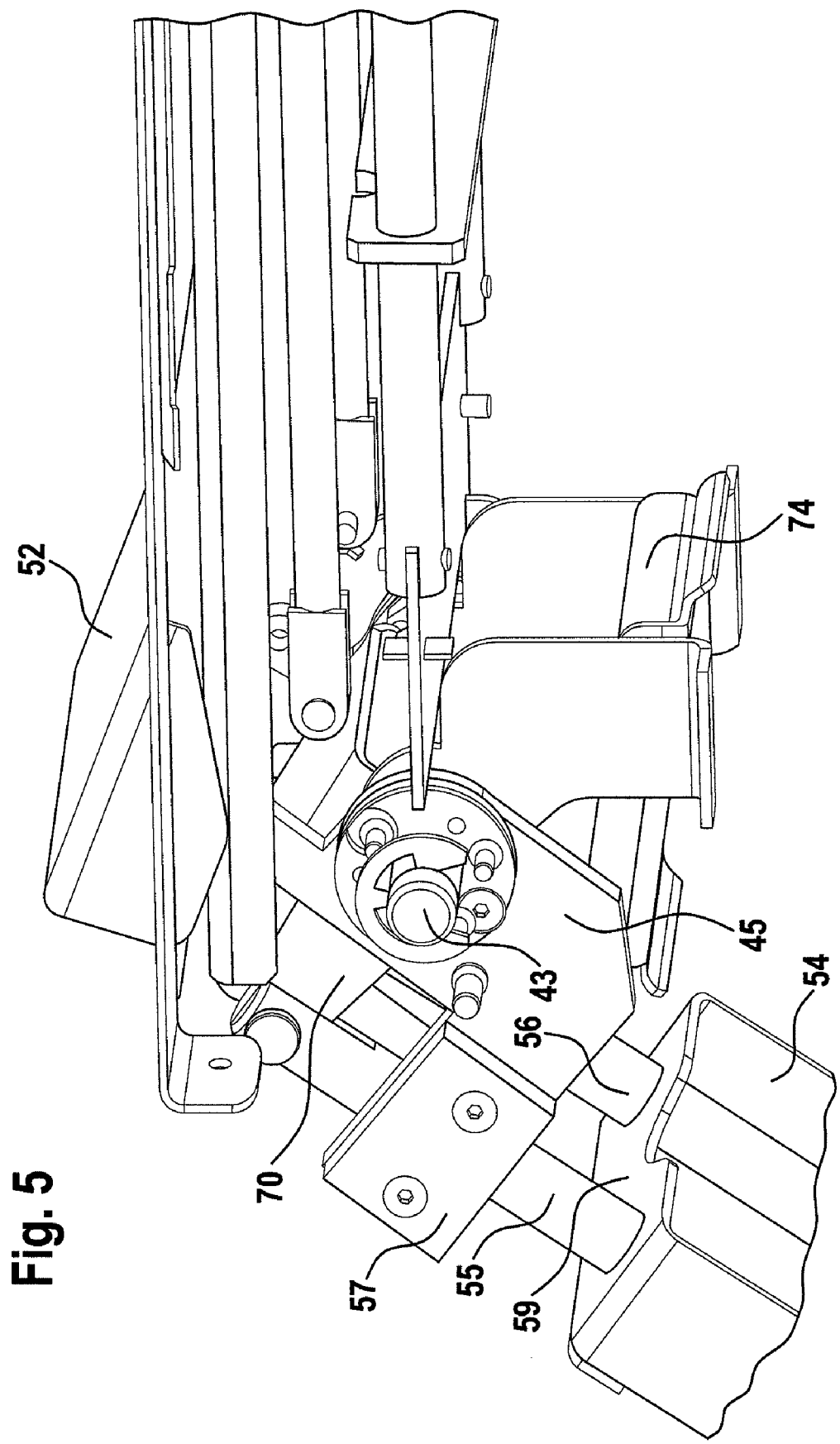
Figure 6:
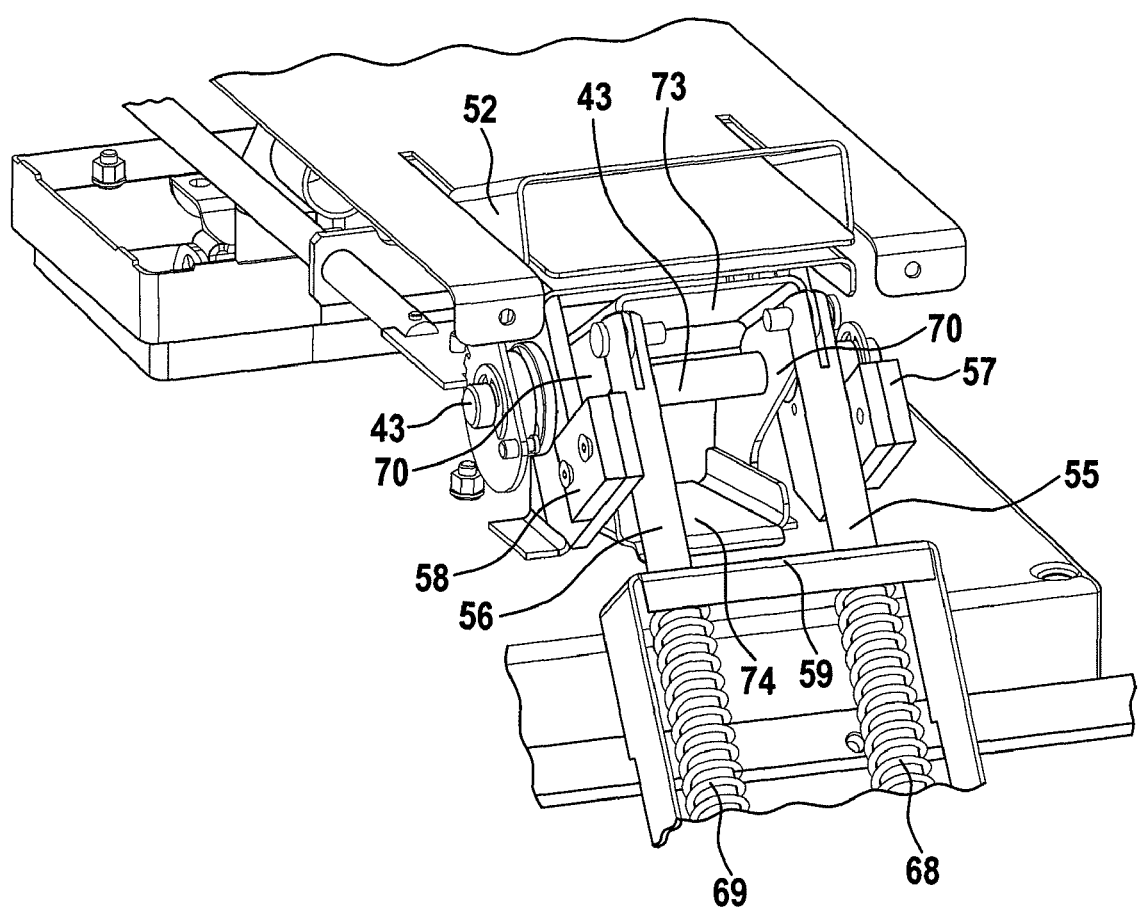

Preferably within the supporting section 12 of the centre arm 10 is arranged a further device 53 for weight relief (see FIG. 2). This device 53 for weight relief includes a holder 54, preferably two holding rods 55, 56, and optionally two distance pieces 57, 58. The holder 54 has in an upwardly pointing web 59 two openings through which the holding rods 55, 56 are passed. On the holding rods 55, 56 are arranged spring elements 68, 69 (shown only schematically), the spring elements 68, 69 being seated on sections of the holding rods 55, 56 which lie within the holder 54. The spring elements are locked by closure or stop elements 60, 61. The stop elements 60, 61 are preferably designed as screw nuts or the like, such that the initial tension of the spring elements is adjustable by the screw nuts. With the ends of the holding rods 55, 56 which are opposite the stop elements 60, 61 and which protrude upwardly out of the holder 54, the holding rods 55, 56 are in each case linked to a link element 70 or the like, the two link elements 70 being capable of being connected to each other by a cover 73 or the like. The link element 70 of lever-like construction is arranged on the pivot shaft 43 and has, at the ends of one arm 71, receptacles for the holding rods 55, 56. The end of the other arm 72 is supported within the inner housing 44 on or in the latter. In addition the link elements 70 can be fixed by a cover and/or guide ramp 74 in the inner housing 44, for example by clamping.

The holder 54 is arranged on or in the supporting section 12 and connected to the latter. The holder 54 for this purpose has outwardly directed projections 77 or the like which correspond to openings 78 in the supporting section 12. To put it another way, the connection between the holder 54 and the supporting section 12 is made by a so-called passage. Thus a firm connection which, however, allows a slight yielding movement is made.

Figure 7:
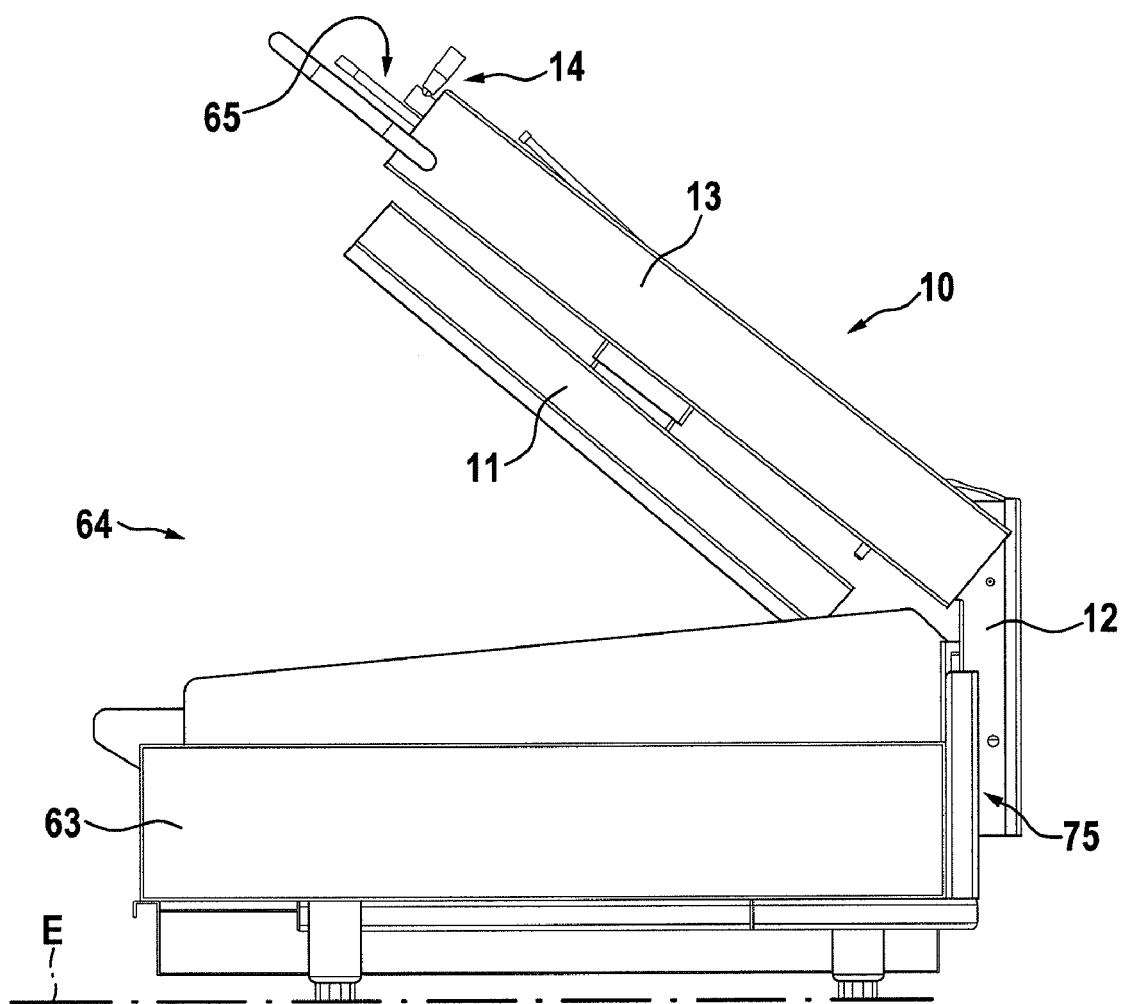
Figure 8:
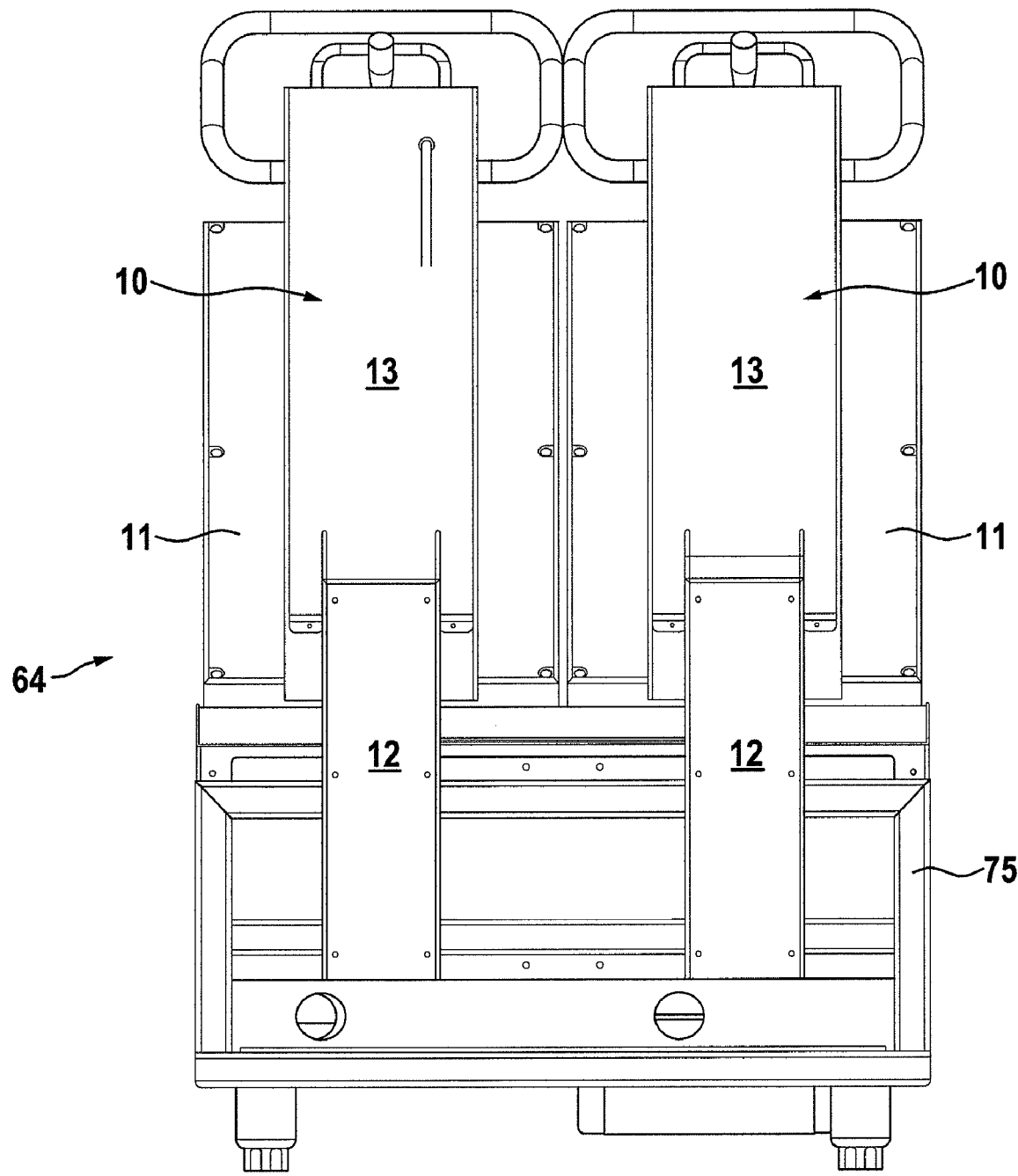

As can further be seen e.g. from FIG. 2, the centre arm 10 is provided with an upper contact grilling or roasting plate 11 and forms an independent grilling or roasting device 62. The upper contact grilling or roasting plate 11 can be attached to the holding section 13 so as to be fixed or movable, preferably by a universal joint 66 or the like. But alternatively, the upper contact grilling or roasting plate 11 is combined with a lower contact grilling or roasting plate 63 to form a contact grilling or roasting device 64 (see FIG. 7). In this case the upper contact grilling or roasting plate 11 is arranged pivotably on the lower contact grilling or roasting plate 63 by the centre arm 10 described above. The upper contact grilling or roasting plate 11 can also be divided. To put it another way, the upper contact grilling or roasting plate 11 can be composed of several partial plates, each partial plate being linked by a separate centre arm 10 described above to the lower contact grilling or roasting plate 63 (see FIG. 8). The centre arm 10 with the or each upper contact grilling or roasting plate 11 can also be fitted by a frame 75 or the like on the lower contact grilling or roasting plate 63. Optionally a device 65 for fixing the holding section 13 relative to the supporting section 12 can be associated with the centre arm 10. The device 65 (see e.g. FIG. 2) is arranged in the holding section 13 of the centre arm 10.

In order to cook the material to be grilled or roasted between the contact grilling or roasting plates 11, 63, the pressure of the upper contact grilling or roasting plate 11 must be adjustable in order not to squeeze or crush material which differs in consistency and/or dimensions. By the actuating element 19, that is, the control lever, which is located at the end face of the centre arm 10, preferably three weight relief stages are set. By rotation at the control lever, the stepped element with the sliding element 16 is moved. Due to the control profile with the different latch steps 25, the sliding element 16 is fixed in definite positions. The axial movement of the sliding element 16 varies the spring pressure. Thus the spring pressure can be increased or decreased by locking the sliding element 16 in different positions. Due to the spring pressure, the weight of the upper contact grilling or roasting plate 11 is absorbed or released by the guide means 15 mounted/fastened on the supporting section 12. Alternatively, locking of the latch rod 27 can take place via the housing 40, for example when the control profile has no latch steps 25, but is a slope.

The invention claimed is:

1. A centre arm for holding an upper contact grilling or roasting plate, comprising:
   a substantially vertical supporting section and a holding section, wherein the holding section is pivotable arranged on the substantially vertical supporting section, and wherein the holding section is adapted to attach to an upper contact grilling or roasting plate; and
   a weight device fitted on the holding section for weight relief of the upper contact grilling or roasting plate, wherein the weight device comprises at least one guide element having one end for pivotable mounting, a sliding element movably arranged on the guide element, a return element arranged on a free end of the guide element between the sliding element and a stop element, and an adjusting device coupled to the sliding element and including a control profile element with a control profile and an actuating element, wherein actuation of the actuating element brings about an axial movement, via the control profile, of the sliding element in a longitudinal direction of the guide element to vary a distance between the sliding element and the stop element.

2. The centre arm of claim 1, wherein the control profile has a control curve running in an axial direction of the guide element.

3. The centre arm of claim 1, wherein the control profile element comprises a stepped element including at least two latch steps, wherein the latch steps are axially offset from each other in the longitudinal direction of the guide element.

4. The centre arm of claim 3, wherein the adjusting device further includes a fixing device having at least one latch bolt corresponding to the latch steps of the stepped element.

5. The centre arm of claim 4, wherein the fixing device includes a latch rod having the latch bolt arranged at one end and the actuating element arranged at the opposite end.

6. The centre arm of claim 5, wherein the latch rod passes through the sliding element and the stepped element so that a longitudinal axis $L_R$ of the latch rod extends approximately parallel to a longitudinal axis $L_F$ of the guide element, and wherein an end of the latch rod, arranged with the latch bolt, is located on a side of the stepped element facing away from the sliding element.

7. A centre arm of claim 5, wherein the latch rod is stepped and forms a stop.

8. The centre arm of claim 7, wherein a section of the latch rod includes a spring element arranged between the stop element and the sliding element.

9. The centre arm of claim 5, wherein the latch rod is arranged for rotatable mounting at an end opposite the latch bolt.

10. The centre arm of claim 5, wherein the actuating element comprises a control lever to enable a rotating movement of the latch rod about an axis of rotation R which runs parallel to a longitudinal axis $L_F$ of the guide element.

11. The centre arm of claim 3, wherein the stepped element is tubular and rigidly connected to the sliding element.

12. The centre arm of claim 1, wherein the guide element includes two guide rods on which the sliding element is guided.

13. The centre arm of claim 1, wherein the sliding element includes a central opening.

14. A combination comprising: the centre arm of claim 1, and the upper contact grilling or roasting plate.

15. The centre arm of claim 1, wherein the substantially vertical supporting section includes a further weight device for weight relief.

16. A contact grilling or roasting device, comprising:
   at least one upper contact grilling or roasting plate, a lower contact grilling or roasting plate, and a centre arm according to claim 1 pivotably connecting the at least one upper contact grilling or roasting plate on the lower contact grilling or roasting plate.

17. The contact grilling or roasting device of claim 16, wherein the at least one upper contact grilling or roasting plate comprises at least two upper contact grilling or roasting plates, and wherein the centre arm comprises at least two identically constructed centre arms pivotably arranged with a respective one of the at least two upper contact grilling or roasting plates on the common lower contact grilling or roasting plate.

* * * * *